United States Patent
Onodera et al.

(10) Patent No.: US 10,164,541 B2
(45) Date of Patent: Dec. 25, 2018

(54) POWER SUPPLY UNIT

(71) Applicant: FUJITSU LIMITED, Kawasaki-shi, Kanagawa (JP)

(72) Inventors: Koichi Onodera, Kawasaki (JP); Hironobu Kageyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/891,420

(22) Filed: Feb. 8, 2018

(65) Prior Publication Data

US 2018/0241315 A1    Aug. 23, 2018

(30) Foreign Application Priority Data

Feb. 21, 2017 (JP) ................ 2017-030311

(51) Int. Cl.
*H02M 1/32* (2007.01)
*H02M 3/335* (2006.01)
*H02M 3/155* (2006.01)
*H02H 7/12* (2006.01)
*H02J 7/34* (2006.01)
(Continued)

(52) U.S. Cl.
CPC ...... *H02M 3/33523* (2013.01); *H02H 7/1213* (2013.01); *H02M 1/32* (2013.01); *H02M 3/155* (2013.01); *H02M 3/33561* (2013.01); *H02J 7/345* (2013.01); *H02J 2007/0039* (2013.01); *H02M 2001/0012* (2013.01)

(58) Field of Classification Search
CPC .. H02M 1/155; H02M 3/335; H02M 3/33523; H02M 1/32; H02M 1/34; H02M 7/125; H02M 7/1257; H02H 7/1213; H02H 7/1222; H02H 7/1227; H02J 2007/0039; H02J 7/0029
See application file for complete search history.

(56) References Cited

U.S. PATENT DOCUMENTS 5,751,532 A * 5/1998 Kanuchok ............ H02H 3/0935
361/115
6,055,145 A * 4/2000 Lagree .................... G06J 1/00
361/115
(Continued)

FOREIGN PATENT DOCUMENTS

JP      H09-322433 A    12/1997
JP      2001-075659 A   3/2001
(Continued)

*Primary Examiner* — Adolf Berhane
(74) *Attorney, Agent, or Firm* — Fujitsu Patent Center

(57) ABSTRACT

A power supply unit includes a conversion circuit that performs power conversion of power input into the power supply unit to supply direct-current power to an output path of the power supply unit, a control circuit that controls the conversion circuit so that output voltage supplied from the conversion circuit to the output path has a fixed value if output current supplied from the conversion circuit to the output path is lower than or equal to an overcurrent trip point and controls the conversion circuit so that the output voltage is decreased if the output current exceeds the overcurrent trip point, a monitoring circuit that monitors a discharge output from a discharge circuit to the output path, and a trip point changing circuit that increases the overcurrent trip point if the discharge output monitored by the monitoring circuit is decreased to a threshold value.

6 Claims, 8 Drawing Sheets

(51) Int. Cl.
*H02M 1/00* (2006.01)
*H02J 7/00* (2006.01)

(56) References Cited

U.S. PATENT DOCUMENTS

| | | | | |
|---|---|---|---|---|
| 6,252,365 | B1* | 6/2001 | Morris | H02H 7/0822 |
| | | | | 318/430 |
| 7,019,951 | B2* | 3/2006 | Plemmons | H02H 6/005 |
| | | | | 361/24 |
| 7,162,656 | B2* | 1/2007 | Vogman | G06F 1/28 |
| | | | | 323/276 |
| 8,461,766 | B2* | 6/2013 | Nerone | H02M 3/33523 |
| | | | | 315/219 |
| 9,368,961 | B2* | 6/2016 | Espino | H02H 7/1213 |
| 9,705,402 | B1* | 7/2017 | Carpenter, Jr. | H01H 85/0241 |
| 9,906,143 | B1* | 2/2018 | Yu | H02M 3/33507 |
| 2002/0015316 | A1 | 2/2002 | Nakazawa et al. | |
| 2007/0229036 | A1 | 10/2007 | Ozawa et al. | |
| 2011/0252247 | A1 | 10/2011 | Yokoyama | |
| 2013/0250627 | A1* | 9/2013 | Herfurth | H02M 3/3376 |
| | | | | 363/21.15 |
| 2016/0241134 | A1* | 8/2016 | Maruyama | H02M 1/4225 |

FOREIGN PATENT DOCUMENTS

| | | | |
|---|---|---|---|
| JP | 2007-274748 A | 10/2007 | |
| JP | 2011-223786 A | 11/2011 | |

\* cited by examiner

POWER SUPPLY UNIT

CROSS-REFERENCE TO RELATED APPLICATION

This application is based upon and claims the benefit of priority of the prior Japanese Patent Application No. 2017-30311, filed on Feb. 21, 2017, the entire contents of which are incorporated herein by reference.

FIELD

The embodiments discussed herein are related to a power supply unit.

BACKGROUND

In related art, a technology is known in which maximum rated current of a power supply is variably set based on a temperature in a method of controlling the output from the power supply. In addition, a technology is known in which, when the electric power used in the main body of a device exceeds threshold power in a state in which a power supply unit is used as a power supply source of the main body of the device, the power supply source of the main body of the device is switched to the power supply unit and a secondary battery. Furthermore, a technology is known in which, when a device uses power exceeding a power supply capacity of a converter, the electric power of the device is covered by the electric power from the converter and the electric power from a secondary battery. Furthermore, a technology is known in which when supply of direct-current power from a main power supply is stopped, the direct-current power is supplied from a power supply different from the main power supply to a load.

The electric power supplied from a power supply unit is varied with the operating status of a load connected to an output path of the power supply unit. However, with the technologies in the related art, if a peak of the variation (hereinafter also referred to as "peak power") exceeds an estimated value, the voltage of the output path of the power supply unit may be decreased.

The followings are reference documents.
[Document 1] Japanese Laid-open Patent Publication No. 2001-075659,
[Document 2] Japanese Laid-open Patent Publication No. 2011-223786,
[Document 3] Japanese Laid-open Patent Publication No. 2007-274748, and
[Document 4] Japanese Laid-open Patent Publication No. 9-322433.

SUMMARY

According to an aspect of the invention, a power supply unit includes a conversion circuit that performs power conversion of power input into the power supply unit to supply direct-current power to an output path of the power supply unit, a control circuit that controls the conversion circuit so that output voltage supplied from the conversion circuit to the output path has a fixed value if output current supplied from the conversion circuit to the output path is lower than or equal to an overcurrent trip point and controls the conversion circuit so that the output voltage is decreased if the output current exceeds the overcurrent trip point, a monitoring circuit that monitors a discharge output from a discharge circuit to the output path, and a trip point changing circuit that increases the overcurrent trip point if the discharge output monitored by the monitoring circuit is decreased to a threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An aspect in which a power supply unit is used in a server in a data center will now be described as an embodiment of the power supply unit.

In recent years, the electric power rates of data centers are increased with the increasing sizes of the data centers. Peak cut by the power supply unit is one effective method for reducing the electric power rate of each data center. The electric power rate is roughly classified into a basic charge determined by a contract type and a usage charge that is calculated based on the usage of electricity. The contract type is determined by maximum electric power supplied from an electric power company to the data center. Accordingly, the basic charge, in the electric power rate, is capable of being reduced by leveling the electric power input into the power supply unit by the power supply unit using the peak cut.

Figure 1:
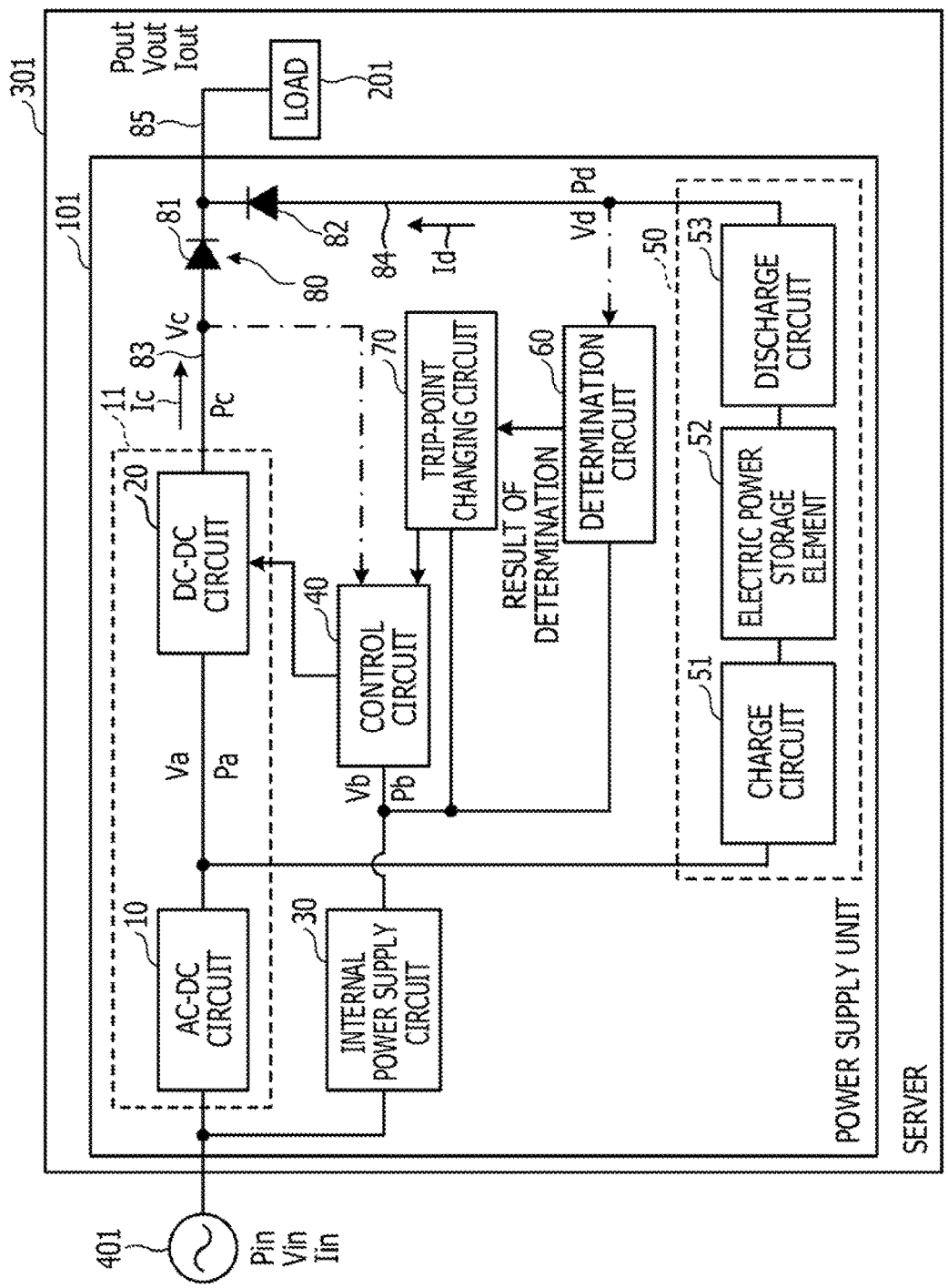
FIG. 1 is a block diagram illustrating an exemplary configuration of a power supply unit according to a first embodiment.

The electric power supplied from the power supply unit based on the electric power input into the power supply unit is varied with the operating status of a load connected to an output path of the power supply unit. The operating status of the load is varied with, for example, the behavior of a program executed by the server in a data server. In order to cut the peak of the variation in the electric power supplied from the power supply unit to level the electric power to be input into the power supply unit, a discharge unit 50 is connected in parallel to a conversion unit 11 in the power supply unit, as illustrated in FIG. 1. The peak of the variation in the electric power supplied from the power supply unit is referred to as peak power.

FIG. 1 is a block diagram illustrating an exemplary configuration of a power supply unit according to a first embodiment. Referring to FIG. 1, a power supply unit 101 has a peak cut function to cut the peak of the variation (the peak power) of output power Pout output from the power supply unit 101. The power supply unit 101 cuts the peak power to level the electric power (input power Pin) to be supplied from a commercial power supply 401 to the power supply unit 101 in a server 301. This enables the basic charge in the electric power rate to be reduced. The power supply unit 101 may be provided outside the server 301.

The commercial power supply 401 is an example of an external power supply. The commercial power supply 401 supplies the input power Pin to be input into the power supply unit 101. Input voltage Vin indicates the voltage of the input power Pin and input current Iin indicates the current of the input power Pin.

The output power Pout is substantially equal to the sum of direct-current power Pc output from the conversion unit 11 and direct-current power Pd output from the discharge unit 50. Output voltage Vout indicates the voltage of the output power Pout and output current Iout indicates the current of the output power Pout.

The output power Pout is supplied to at least one load 201. The load 201 includes a circuit including, for example, a processor that executes programs and a memory that stores data.

The power supply unit 101 includes the conversion unit 11, an output path 80, an internal power supply circuit 30, a control circuit 40, the discharge unit 50, a determination circuit 60, and a trip-point changing circuit 70.

The conversion unit 11 performs voltage conversion of the alternating-current input power Pin, which is supplied from the commercial power supply 401 to the power supply unit 101, into the direct-current power Pc. The conversion unit 11 supplies the direct-current power Pc resulting from the voltage conversion of the input power Pin to an output line 83 on the output path 80.

The conversion unit 11 includes an AC-DC circuit 10 and a DC-DC circuit 20. The "DC" is an abbreviation of "direct current" and the "AC" is an abbreviation of "alternating current".

The AC-DC circuit 10 is an AC-DC converter that performs the voltage conversion of the input power Pin of predetermined nominal voltage (for example, AC 200 V) into intermediate power Pa of predetermined nominal voltage (for example, DC 400 V). intermediate voltage Va indicates the voltage of the intermediate power Pa. The direct-current intermediate power Pa output from the AC-DC circuit 10 is input into the DC-DC circuit 20 and the discharge unit 50.

The DC-DC circuit 20 is a DC-DC converter that performs the voltage conversion of the direct-current intermediate power Pa into the direct-current power Pc of predetermined nominal voltage (for example, DC 12 V). For example, the DC-DC circuit 20 decreases the intermediate power Pa to the direct-current power Pc. The direct-current power Pc output from the DC-DC circuit 20 is supplied to the output line 83.

Output voltage Vc supplied from the DC-DC circuit 20 to the output line 83 indicates the voltage of the direct-current power Pc. Output current Ic supplied from the DC-DC circuit 20 to the output line 83 indicates the current of the direct-current power Pc.

The internal power supply circuit 30 is an AC-DC converter that performs the voltage conversion of the alternating-current input power Pin into internal power Pb of predetermined nominal voltage (for example, DC 5 V), Internal voltage Vb indicates the voltage of the internal power Pb. The direct-current internal power Pb output from the internal power supply circuit 30 is supplied to the control circuit 40, the determination circuit 60, and the trip-point changing circuit 70. The control circuit 40, the determination circuit 60, and the trip-point changing circuit 70 operate using the internal power Pb as power supply power. The internal power Pb may be supplied to another circuit (for example, a circuit in the discharge unit 50) as the power supply power, if desired.

The discharge unit 50 discharges the electric power of an electric power storage element 52 to an output line 84 on the output path 80. The discharge unit 50 includes a charge circuit 51, the electric power storage element 52, and a discharge circuit 53.

The charge circuit 51 is an exemplary circuit that charges the electric power storage element 52 based on the intermediate power Pa supplied from the AC-DC circuit 10. For example, the charge circuit 51 is a DC-DC converter that performs the voltage conversion of the direct-current intermediate power Pa into direct-current power of predetermined nominal voltage (for example, DC 48 V). The charge circuit 51 supplies the direct-current power subjected to the voltage conversion to the electric power storage element 52. The electric power storage element 52 is charged with the supplied direct-current power.

The electric power storage element 52 is an example of an electric power storage unit Specific examples of the electric power storage element 52 include a lithium ion capacitor, an electric double layer capacitor, and a battery.

The discharge circuit 53 is an exemplary circuit that discharges the output to the output line 84 on the output path 80. More specifically, the discharge circuit 53 discharges the direct-current power Pd from the electric power storage element 52 to the output line 84 on the output path 80. For example, the discharge circuit 53 is a DC-DC converter that performs the voltage conversion of the electric power from the electric power storage element 52 into the direct-current power Pd of predetermined nominal voltage (for example, DC 12 V). The discharge circuit 53 may be a step-down converter that generates the direct-current power Pd by decreasing the electric power from the electric power storage element 52 or may be a step-up converter that generates the direct-current power Pd by increasing the electric power from the electric power storage element 52. The discharge circuit 53 supplies the direct-current power Pd to the output line 84.

Output voltage Vd supplied from the discharge circuit 53 to the output line 84 indicates the voltage of the direct-current power Pd. Output current Id supplied from the discharge circuit 53 to the output line 84 indicates the current of the direct-current power Pd.

The output path 80 includes the output line 83, the output line 84, and an output line 85. The output line 83 is a power supply line through which the direct-current power Pc flows. A diode 81 that blocks the flowing of the current from at least one of the load 201 and the discharge unit 50 to the conversion unit 11 is inserted in series on the output line 83. The output line 84 is a power supply line through which the direct-current power Pd flows. A diode 82 that blocks the flowing of the current from at least one of the load 201 and the conversion unit 11 to the discharge circuit 53 in the discharge unit 50 is inserted in series on the output line 84. The output line 85 makes a connection between a connection node between the output line 83 and the output line 84 and the load 201. The output line 85 is a power supply line through which the output power Pout flows.

A target value of the output voltage Vc from the DC-DC circuit 20 in the conversion unit 11 is set so as to be slightly higher than a target value of the output voltage Vd from the discharge circuit 53 in the discharge unit 50. In other words, the target value of the output voltage Vd from the discharge circuit 53 in the discharge unit 50 is set so as to be slightly lower than the target value of the output voltage Vc from the DC-DC circuit 20 in the conversion unit 11. For example, it is assumed that forward voltage of each of the diodes 81 and 82, the cathodes of which are connected to each other, is 0.3 V. In this case, the DC-DC circuit 20 in the conversion unit 11 is controlled so that the output voltage Vc is equal to a target value 12.3 V while the discharge circuit 53 in the discharge unit 50 is controlled so that the output voltage Vd is equal to a target value 12.2 V. Accordingly, the output voltage Vout has a value of 11.9 V to 12.0 V.

An overcurrent trip point of the DC-DC circuit 20 is set to the current value of the output current Ic when the power supply unit 101 supplies the output power Pout the peak of the variation of which is lower than or equal to a predetermined value (the output power Pout the peak of the variation of which is lower than or equal to a predetermined value is also referred to as "steady-state power"). Specifically, the overcurrent trip point of the DC-DC circuit 20 is set to a current value lower than or equal to rated output current of the DC-DC circuit 20.

The control circuit 40 is an example of a control unit. The output voltage Vc from the DC-DC circuit 20 is fed back to the control circuit 40. The control circuit 40 monitors the output current Ic from the DC-DC circuit 20.

If the output current Ic from the DC-DC circuit 20 is lower than or equal to the overcurrent trip point, the control circuit 40 controls the DC-DC circuit 20 so that the output voltage Vc from the DC-DC circuit 20 has a fixed value (for example, 12.3 V described above). If the output current Ic exceeds the overcurrent trip point, the control circuit 40 controls the DC-DC circuit 20 so that the direct-current power Pc from the DC-DC circuit 20 does not exceed the direct-current power value at the overcurrent trip point and has a fixed value. In other words, the output voltage Vc is decreased with the increasing direct-current power Pc in the state in which the output current Ic exceeds the overcurrent trip point.

When the direct Current power Pc is the steady-state power, the steady-state power is supplied from the DC-DC circuit 20 because the output voltage Vc from the DC-DC circuit 20 is higher than the output voltage Vd from the discharge circuit 53, When the peak power the voltage value of which is higher than the steady-state power occurs due to increase in power consumption in the load 201 and the current value of the output current Ic from the DC-DC circuit 20 is made higher than or equal to the overcurrent trip point, the output voltage Vc from the DC-DC circuit 20 starts to decrease. When the output voltage Vc is decreased to the output voltage Vd from the discharge circuit 53, the peak power starts to be supplied from both the DC-DC circuit 20 and the discharge circuit 53.

The supply of the peak power from both the DC-DC circuit 20 and the discharge circuit 53 causes the input power Pin of the power supply unit 101 to be leveled to decrease the maximum value of the input power Pin. Accordingly, the basic charge in the electric power rate is capable of being reduced.

The capacity of the electric power storage element 52 in the discharge unit 50 is determined based on the magnitude, the duration, and the frequency of occurrence of the peak power, which are estimated in advance. If the peak power exceeding the estimation occurs, the electric charge stored in the electric power storage element 52 becomes insufficient and, thus, the direct-current power Pd output from the discharge unit 50 becomes insufficient. Accordingly, since the output voltage Vd from the discharge circuit 53 is decreased, the output voltage Vout from the power supply unit 101 is also decreased. As a result, the power supply unit 101 may not capable of supplying the electric power desired for the load 201.

Since the magnitude of the peak power, among the magnitude, the duration, and the frequency of occurrence of the peak power, is determined by maximum electric power consumed by the load 201, it is relatively easy to estimate the magnitude of the peak power in advance. However, it is difficult to estimate the duration and the frequency of occurrence of the peak power. This is because the duration and the frequency of occurrence are determined by, for example, the program executed on the server 301 and it is difficult to identify the program executed in the operation of the server 301. Accordingly, the duration and the frequency of occurrence of the peak power may infrequently exceed the estimated values depending on the executed program. In order to design the power supply unit 101 so that the electric power desired for the load 201 is not made insufficient even if any program is executed, for example, the electric power storage element 52 of a large capacity is desirably prepared. However, it is practically difficult to prepare the electric power storage element 52 of a large capacity in the discharge unit 50 in advance.

Accordingly, the power supply unit 101 according to the present embodiment has a function to suppress reduction in the output voltage Volt from the power supply unit 101 (the voltage of the output line 85 on the output path 80 in the present embodiment) even if the peak power of the duration or the frequency of occurrence, which exceeds the estimated value, occurs.

Specifically, the conversion unit 11 includes the DC-DC circuit 20 configured so as to be capable of supplying the peak power (for example, 1,800 W) higher than the steady-state power (for example, 1,200 W). In addition, the discharge unit 50 includes the components (the charge circuit 51, the electric power storage element 52, and the discharge circuit 53) capable of discharge at the magnitude, the duration, and the frequency of occurrence of the peak power, which are estimated. However, since the peak power is also supplied from the DC-DC circuit 20 only with the above components and no supply from the electric power storage element 52 in the discharge unit 50 is performed, the electric power is not capable of being leveled. Accordingly, the power supply unit 101 of the present embodiment includes the determination circuit 60 and the trip-point changing circuit 70. The determination circuit 60 is an example of a monitoring unit. The trip-point changing circuit 70 is an example of a trip point changing unit.

The determination circuit 60 monitors the discharge output from the discharge unit 50 to the output path 80. The determination circuit 60 monitors, for example, the output voltage Vd from the discharge unit 50 to the output line 83.

Figure 2:
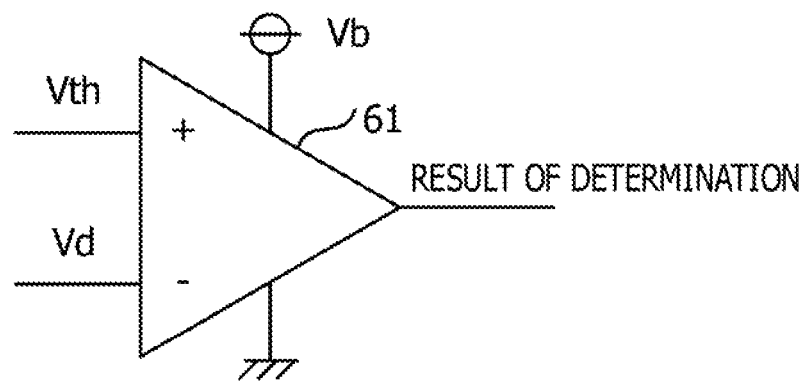
FIG. 2 illustrates an exemplary configuration of a determination circuit.

FIG. 2 illustrates an exemplary configuration of the determination circuit. The determination circuit 60 includes a comparison circuit 61 that compares the output voltage Vd with threshold voltage Vth. The comparison circuit 61 is, for example, a comparator. The threshold voltage Vth is an example of a threshold value and is set to a voltage value leer than the target value of the output voltage Vd.

The determination circuit 60 monitors the output voltage Vd from the discharge circuit 53. If the output voltage Vd is higher than or equal to the threshold voltage Vth (for example, 11.8 V), the determination circuit 60 outputs "0" as information indicating the result of the determination. The trip-point changing circuit 70 sets the overcurrent trip point of the DC-DC circuit 20 to the current value of the output current Ic when the power supply unit 101 supplies the steady-state power if the result of the determination is "0". In contrast, if the output voltage Vd is, lower than the threshold voltage Vth, the determination circuit 60 outputs "1" as information indicating the result of the determination. The trip-point changing circuit 70 sets the overcurrent trip point of the DC-DC circuit 20 to the current value of the output current Ic when the power supply unit 101 supplies the peak power if the result of the determination is "1".

In order to suppress frequent switching of the overcurrent trip point, it is desirable to provide sufficient hysteresis for the threshold value (the threshold voltage Vth in the present embodiment) to be compared with the discharge output from the discharge unit 50.

Figure 3:
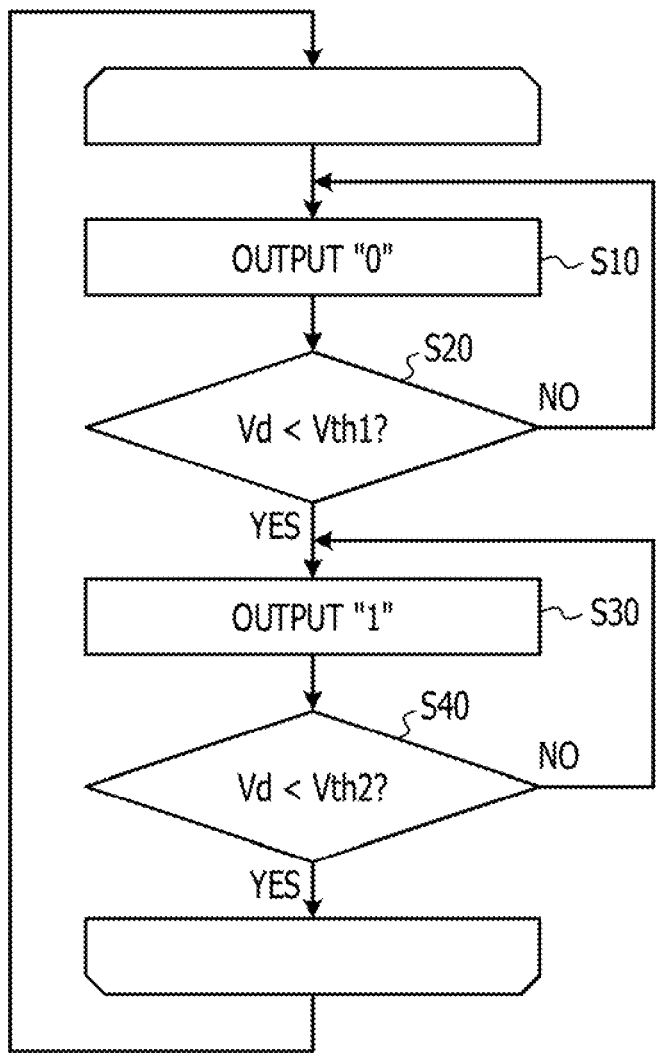
FIG. 3 is a flowchart illustrating an exemplary operational process performed by the determination circuit.

FIG. 3 is a flowchart illustrating an exemplary operational process performed by the determination circuit when the hysteresis is provided, Referring to FIG. 3, in Step S10, the determination circuit 60 outputs "0". In Step S20, the determination circuit 60 determines whether the output voltage Vd is lower than a first threshold value Vth1. The first threshold value Vth1 is an example of a first threshold value and is set to, for example, 11.8 V. If the output voltage Vd is higher than or equal, to the first threshold value Vth1 (NO in Step S20), the process goes back to Step S10 and the determination circuit 60 continues the output of "0". If the output voltage Vd lower than the first threshold value Vth1 is detected (YES in Step S20), in Step S30, the determination circuit 60 outputs "1". In Step S40, the determination circuit 60 determines whether the output voltage Vd is higher than a second threshold value Vth2. The second threshold value Vth2 is an example of a second threshold value higher than the first threshold value and is set to, for example, 12.1 V. If the output voltage Vd is lower than or equal to the second threshold value Vth2 (NO in Step S40), the process goes back to Step S30 and the determination circuit 60 continues the output of "1". If the output voltage Vd higher than the second threshold value Vth2 is detected (YES in Step S40), the process goes back to Step S10 and the determination circuit 60 outputs "0".

Figure 4:
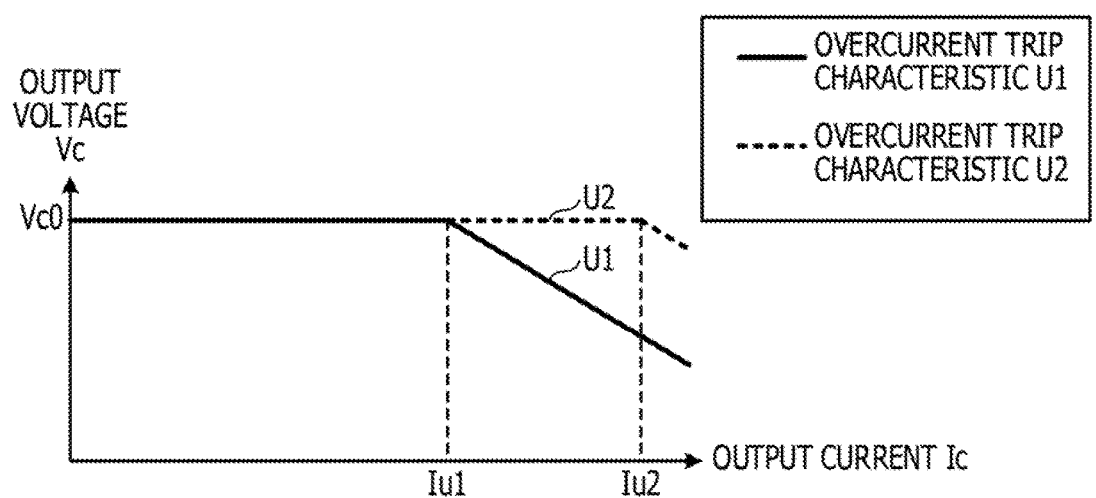
FIG. 4 is a graph illustrating an example of overcurrent trip characteristics.

When "0" is output, the trip-point changing circuit 70 sets the overcurrent trip point of the DC-DC circuit 20 to an overcurrent trip point Iu1, which is the current value of the output current Ic when the power supply unit 101 supplies the steady-state power (refer to FIG. 4). In contrast, when "1" is output, the trip-point changing circuit 70 sets the overcurrent trip point of the DC-DC circuit 20 to an overcurrent trip point Iu2, which is the current value of the output current Ic when the power supply unit 101 supplies the peak power (refer to FIG. 4).

FIG. 4 is a graph illustrating an example of overcurrent trip characteristics representing the relationship between the output voltage Vc and the output current Ic in the DC-DC circuit 20. For example, a current value 100 A corresponding to the steady-state power 1,200 W is set as the "overcurrent trip point Iu1" and a current value 150 A corresponding to the peak power 1,800 W is set as the "overcurrent trip point Iu2".

If the output voltage Vd monitored by the determination circuit 60 is decreased to a value lower than or equal to the threshold voltage Vth (the first threshold value Vth1 when the hysteresis is provided), the trip-point changing circuit 70 changes the overcurrent trip characteristic of the DC-DC circuit 20 from an overcurrent trip characteristic U1 to an overcurrent trip characteristic U2. This increases the overcurrent trip point of the DC-DC circuit 20 from the overcurrent trip point Iu1 to the overcurrent trip point Iu2.

Figure 5:
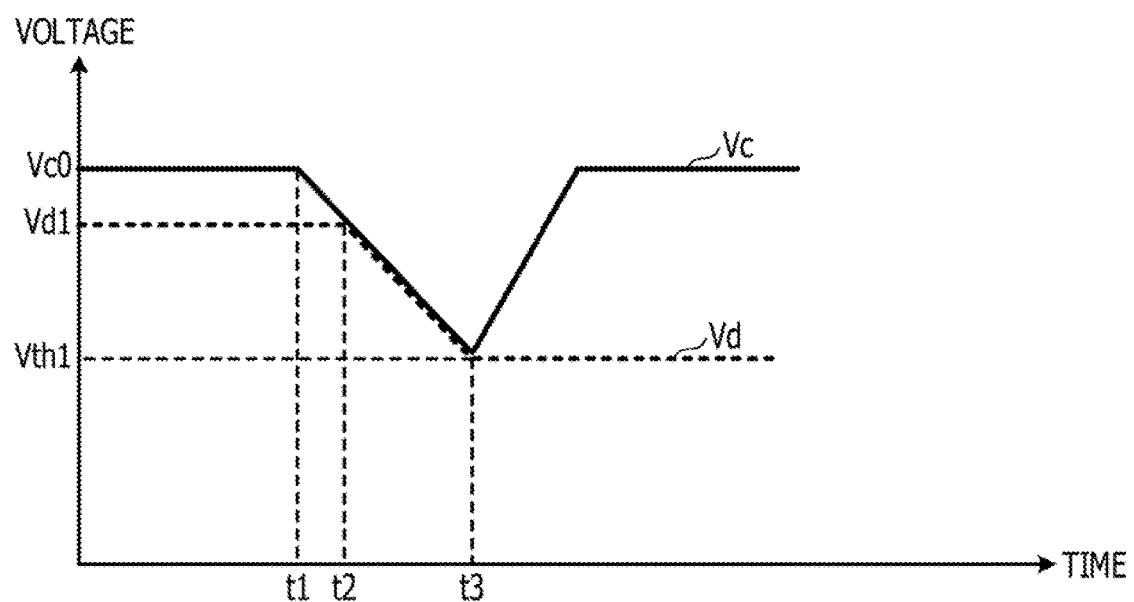
FIG. 5 is a timing chart illustrating a first transition example of output voltage.

FIG. 5 is a timing chart illustrating a first transition example of the output, voltage. FIG. 5 illustrates a case in which the discharge circuit 53 is not configured so that, the output voltage Vd is kept at a fixed value even if the voltage of the electric power storage element 52 is decreased (for example, a case in which the discharge circuit 53 is a simple switch circuit that turns on or off the connection between the electric power storage element 52 and the output line 84).

Referring to FIG. 5, a voltage value Vc0 of the output voltage Vc is set so as to be higher than a voltage value Vd1 of the output voltage Vd. The control circuit 40 decreases the output voltage Vc so that the direct-current power Pc has the fixed value if peak current occurs in a state in which the DC-DC circuit 20 is controlled so that the output voltage Vc has the fixed voltage value Vc0 and the output current Ic is higher than or equal to the overcurrent trip point Iu1 (refer to a time t1 to a time t2), When the voltage value of the output voltage Vc is decreased to the voltage value Vd1 of the output voltage Vd, the control circuit 40 controls the peak power so as to be supplied from both the DC-DC circuit 20 and the discharge circuit 53. This gradually decreases the voltage values of the output voltage Vc and the output voltage Vd (refer to the time t2 to a time t3). When the output voltage Vd is decreased to the first threshold value Vth1, the trip-point changing circuit 70 increases the overcurrent trip point of the DC-DC circuit 20 from the overcurrent trip point Iu1 to the overcurrent trip point Iu2. Since this makes the output current Ic from the DC-DC circuit 20 lower than or equal to the overcurrent trip point Iu2, the control circuit 40 starts to control the DC-DC circuit 20 again so that the output voltage Vc has the fixed voltage value Vc0. This increases the output voltage Vc to the voltage value Vc0. In contrast, since the output voltage Vd is charged again based on the intermediate power Pa from the conversion unit 11, the output voltage Vd is increased to the voltage value Vd1 again although this is not illustrated in FIG. 5.

Figure 6:
FIG. 6 is a timing chart illustrating a second transition example of the output voltage.

FIG. 6 is a timing chart illustrating a second transition example of the output voltage. FIG. 6 illustrates a case in which the discharge circuit 53 is configured so that the output voltage Vd is kept at the fixed value even if the voltage of the electric power storage element 52 is decreased (for example, a case in which the discharge circuit 53 is a DC-DC converter).

The voltage value Vc0 of the output voltage Vc is set so as to be higher than the voltage value Vd1 of the output voltage Vd. The control circuit 40 decreases the output voltage Vc so that the direct-current power Pc has the fixed value if the peak current occurs in the state in which the DC-DC circuit 20 is controlled so that the output voltage Vc has the fixed voltage value Vc0 and the output current Ic is higher than or equal to the overcurrent trip point Iu1 (refer to a time t11 to a time t12). When the voltage value of the output voltage Vc is decreased to the voltage value Vd1 of the output voltage Vd, the control circuit 40 controls the peak power so as to be supplied from both the DC-DC circuit 20 and the discharge circuit 53. When the discharge circuit 53 performs control so that the output voltage Vd is kept at the fixed value even if the voltage of the electric power storage element 52 is decreased, the voltage values of the output voltage Vc and the output voltage Vd are kept for a certain time period (refer to the time 12 to a time 13). When the electric power stored in the electric power storage element 52 becomes insufficient, the voltage values of the output voltage Vc and the output voltage Vd are gradually decreased (refer to the time t13 to a time t14). When the output voltage Vd is decreased to the first threshold value Vth1, the trip-point changing circuit 70 increases the overcurrent trip point of the DC-DC circuit 20 from the overcurrent trip point Iu1 to the overcurrent trip point Iu2. Since this makes the output current Ic from the DC-DC circuit 20 lower than or equal to the overcurrent trip point Iu2, the control circuit 40 starts to control the DC-DC circuit 20 again so that the output voltage Vc has the fixed voltage value Vc0. This increases the output voltage Vc to the voltage value Vc0. In contrast, since the output voltage Vd is charged again based on the intermediate power Pa from the conversion unit 11, the output voltage Vd is increased to the voltage value Vd1 again although this is not illustrated in FIG. 6.

Since the power supply unit 101 according to the present embodiment has the above configuration, the power supply unit 101 operates in the following manners when the peak power within the estimation occurs and when the peak power exceeding the estimation occurs.

<When Peak Power is Within Estimation>

Figure 7:
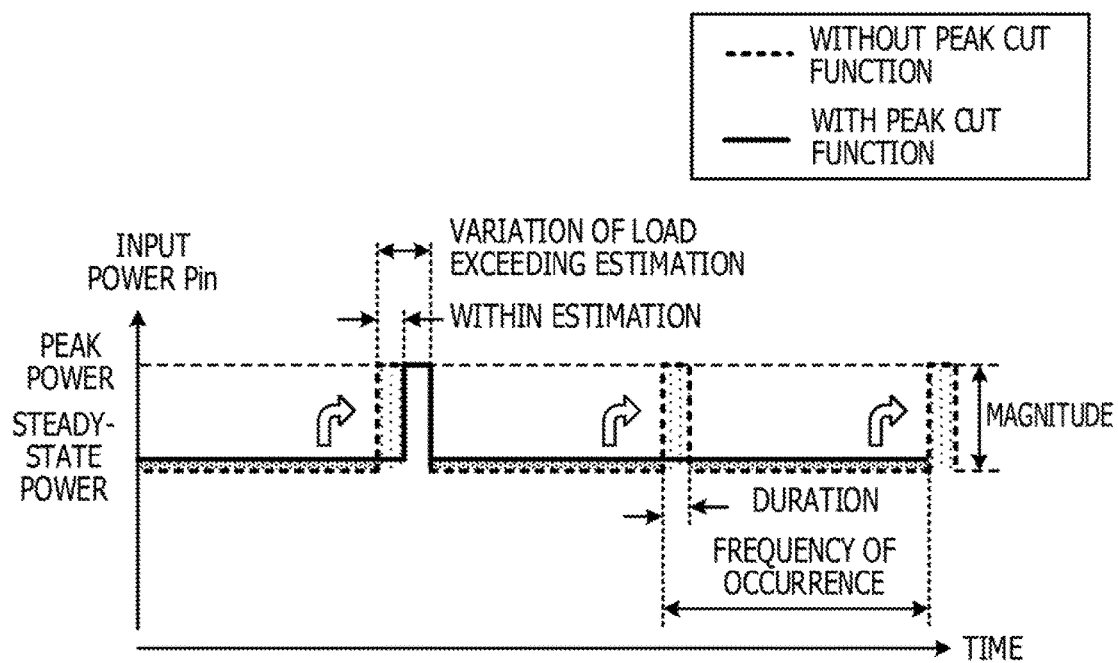
FIG. 7 is a timing chart illustrating a transition example of input voltage when peak power occurs.

Since the overcurrent trip point of the output from the DC-DC circuit 20 is set to the current value corresponding to the steady-state power, the steady-state power is supplied from the DC-DC circuit 20 and the peak power is supplied from the DC-DC circuit 20 and the discharge circuit 53, Accordingly, the input power Pin into the power supply unit 101 is leveled, as illustrated in FIG. 7. Referring to FIG. 7, the steady-state power is slightly increased by an amount corresponding to the charge in the electric power storage element 52, compared with a case in which the peak cut function is not provided. In contrast, since the peak power is supplied from the DC-DC circuit 20 and the discharge circuit 53, the variation in the input power Pin is suppressed.

<When Peak Power Exceeds Estimation>

If the peak power exceeds the estimation, the output voltage Vd from the discharge circuit 53 is decreased. Upon detection of the decrease of the output voltage Vd to a value lower than or equal to the threshold value by the determination circuit 60, the overcurrent trip point of the DC-DC circuit 20 is increased to the current value corresponding to the peak power by the trip-point changing circuit 70. This causes the entire electric power to be supplied from the DC-DC circuit 20 to the load 201. The input power Pin at this time is illustrated in FIG. 7. Since the entire electric power is supplied from the DC-DC circuit 20, it is possible to suppress a decrease of the output voltage Vout although the degree of leveling of the input power Pin is reduced in the power supply unit 101.

As described above, according to the present embodiment, it is possible to level the input power when the peak power is within the estimation. Since the peak power infrequently exceeds the estimated values (the duration and the frequency of occurrence), it is possible to perform the leveling for many time periods during the operation and to reduce the electric power rate (the basic charge) of the data center. In contrast, since the entire electric power is capable of being supplied from the DC-DC circuit 20 even if the peak power exceeding the estimated, values (the duration and the frequency of occurrence) infrequently occurs, it is possible to suppress a decrease of the output voltage Vout from the power supply unit.

Figure 8:
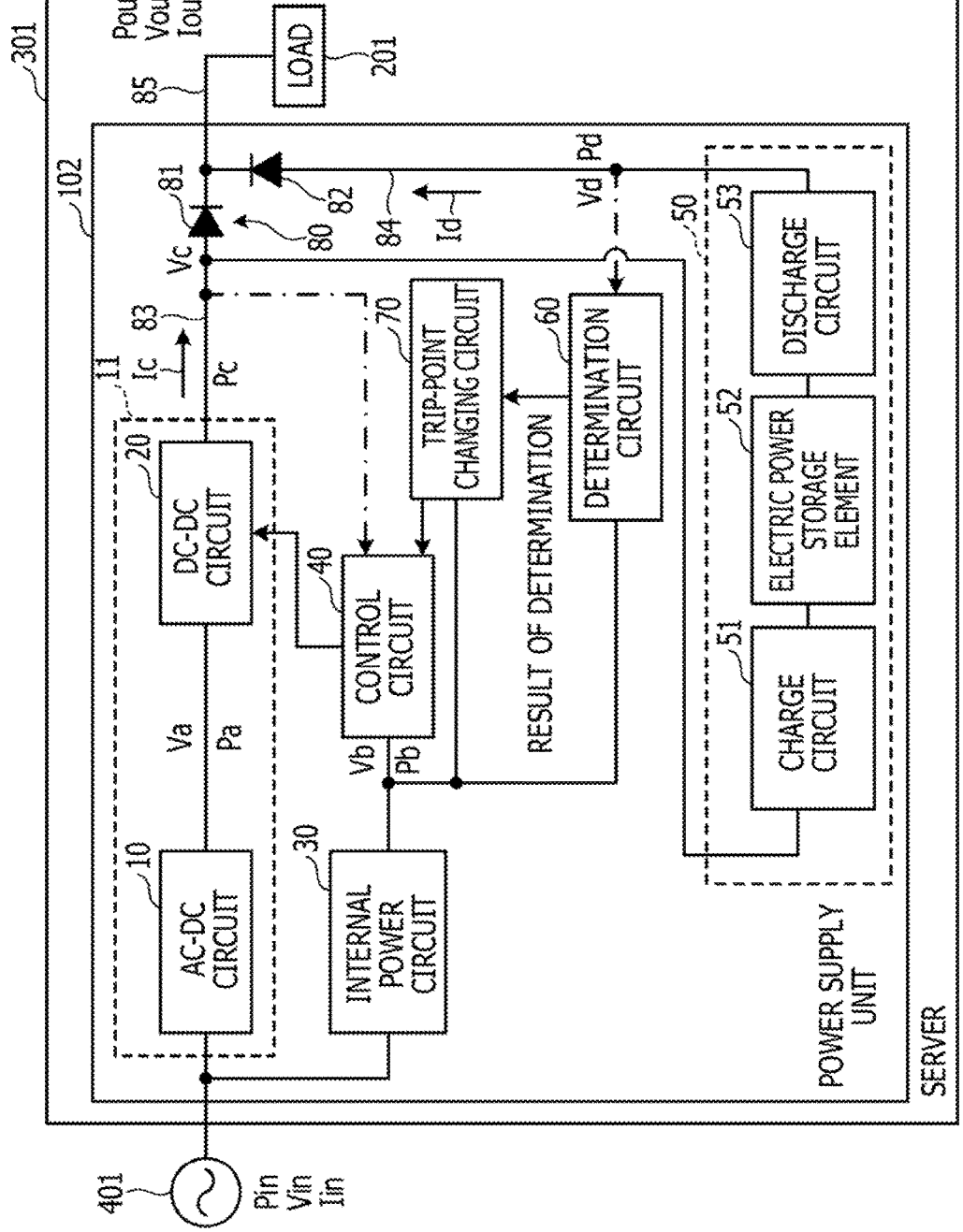
FIG. 8 is a block diagram illustrating an exemplary corination of a power supply unit according to a second embodiment.

FIG. 8 is a block diagram illustrating an exemplary configuration of a power supply unit according to a second embodiment. In the second embodiment, the charge of the electric power storage element 52 is performed based on the direct-current power Pc from the DC-DC circuit 20 The overcurrent trip point Iu1 is set to a value that is increased by an amount corresponding to charge current. For example, when the charge, current is 2 A, the overcurrent trip point Iu1 is set to 102 A (=100 A+2 A). In addition, the power supply capacity of the DC-DC circuit 20 is increased by an amount corresponding to the charge power. Since the power supply capacity of the DC-DC circuit 20 is desired to be increased by 24.6 W (=12.3 V×2 A) when the charge current is 2 A, the power supply capacity of the DC-DC circuit 20 is set to 1,824.6 W (=1,800 W+24.6 W). The other components and operations are the same as those in the first embodiment in which the electric power charged in the charge circuit 51 is supplied to the input side of the DC-DC circuit 20.

Although the power supply units according to the embodiments are described above the present disclosure is not limited to these specific examples and embodiments and various changes and modifications including combination or replacement of part or all of the embodiments may be made without departing from the true spirit and scope of the present disclosure.

For example, direct-current voltage may be input into the electric power input. In addition, the power supply unit is not limited to the aspect in which the power supply unit is provided in the server and may be provided in an apparatus other than the server. Furthermore, the discharge unit may be provided outside the power supply unit.

Each of the diodes 81 and 82 may be a metal oxide semiconductor field effect transistors (MOSFET). In this case, the control circuit 40 may detect the current value of the output current Ic flowing through the output line 83 based on the voltages at both sides of an on-resistance of the MOSFET.

As the method of detecting the peak power that exceeds the estimation, the output voltage from the discharge circuit is monitored to detect a decrease of the voltage to a value lower than or equal to the threshold value in the above embodiments. However, the determination circuit 60 may calculate the peak power based on the output current Id and the output voltage Vd from the discharge circuit 53 in the discharge unit 50 and, if the integrated value of the calculated peak power exceeds a predetermined amount of electric power, the determination circuit 60 may determine that the peak power exceeds the estimation.

The hysteresis is provided for the threshold value as the method of suppressing frequent switching of the overcurrent trip point when the peak power exceeds the estimation in the above embodiments. However, the determination circuit 60 may inhibit switching of the overcurrent trip point for a certain time period based on the count value by a timer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power supply unit comprising;
   a conversion circuit that performs power conversion of power input into the power supply unit to supply direct-current power to an output path of the power supply unit;

a control circuit that controls the conversion circuit so that output voltage supplied from the conversion circuit to the output path has a fixed value if output current supplied from the conversion circuit to the output path is lower than or equal to an overcurrent trip point and controls the conversion circuit so that the output voltage is decreased if the output current exceeds the overcurrent trip point;

a monitoring circuit that monitors a discharge output from a discharge circuit to the output path; and a trip point changing circuit that increases the overcurrent trip point if the discharge output monitored by the monitoring circuit is decreased to a threshold value.

2. The power supply unit according to claim 1, wherein the discharge circuit supplies voltage lower than the output voltage from the conversion circuit to the output path.

3. The power supply unit according to claim 1, wherein the discharge circuit includes an electric power storage portion charged with power input into the conversion circuit or power output from the conversion circuit.

4. The power supply unit according to claim 1, wherein the trip point changing circuit increases the overcurrent trip point if the discharge output monitored by the monitoring circuit is decreased to a value lower than or equal a first threshold value and decreases the overcurrent trip point if the discharge output monitored by the monitoring circuit is increased to a value higher than or equal a second threshold value higher than the first threshold value.

5. The power supply unit according to claim 1, wherein the monitoring circuit integrates power calculated based on discharge output voltage and discharge output current from the discharge circuit to the output path and, if the integrated value exceeds a predetermined amount of electric power, determines that the discharge output is decreased to a value lower than or equal to the threshold value.

6. The power supply unit according to claim 1, wherein the monitoring circuit inhibits switching of the overcurrent trip point for a certain time period based on a count value by a timer.

* * * * *